O. A. BOYER.
RESILIENT WHEEL.
APPLICATION FILED MAY 29, 1918.
1,291,744.
Patented Jan. 21, 1919.
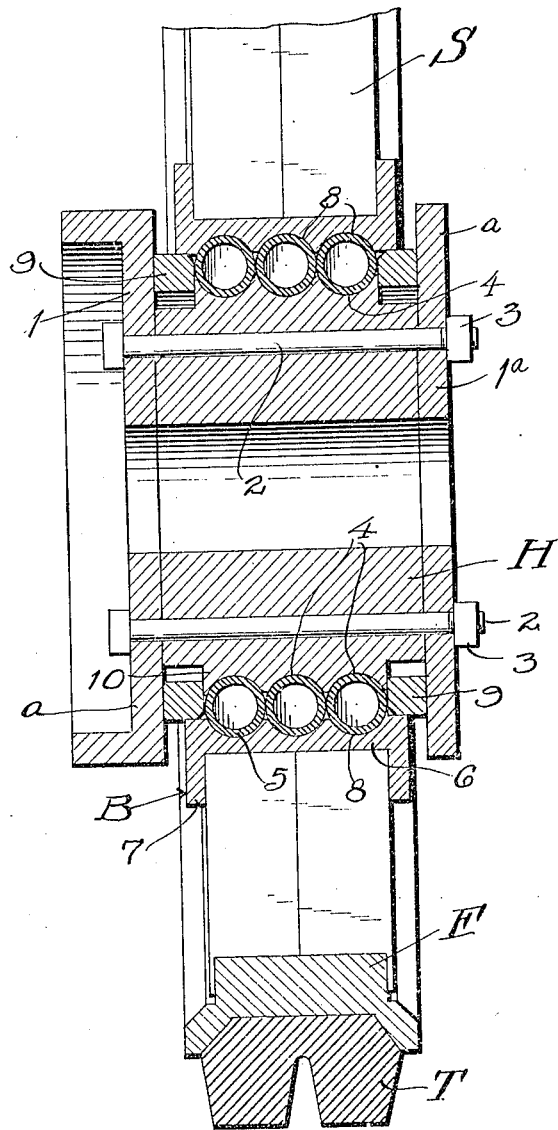
Inventor
Oram A. Boyer
By Frederick S. Still,
Attorney

UNITED STATES PATENT OFFICE.

ORAM A. BOYER, OF MILWAUKEE, WISCONSIN.

RESILIENT WHEEL.

1,291,744.　　　　　Specification of Letters Patent.　　Patented Jan. 21, 1919.

Application filed May 29, 1918. Serial No. 237,249.

*To all whom it may concern:*

Be it known that I, ORAM A. BOYER, a citizen of the United States, residing at Milwaukee, in the county of Milwaukee and State of Wisconsin, have invented certain new and useful Improvements in Resilient Wheels, of which the following is a specification.

This invention comprehends certain new and useful improvements in resilient wheels, and it has for its primary object a practical, durable and efficient construction of wheel of this character especially designed for use on automobiles, motor trucks and similar vehicles, the parts being so constructed and arranged that they may be easily manufactured and assembled and not liable to get out of order and whereby the disadvantages incidental to the use of the ordinary pneumatic tire at the tread of the wheel are done away with.

The invention has for a further object an improved construction of wheel of this general type in which one or more shock absorbing agencies, such as a pneumatic tube or its equivalent, are interposed between the hub and the body of the wheel to secure the desired characteristics of resiliency, said shock absorbing agencies being thoroughly protected from injury and the parts being so arranged that all shocks incidental to service will be compensated for and absorbed, not only shocks received in the plane of the wheel, or from the circumference thereof, and not only radial shocks but in angular and oblique directions.

A more specific object of the invention is to provide a novel and improved structure of this general character wherein the wheel body and the hub are capable of relative bodily movement in a direction radial of the hub, longitudinally of the hub or of laterally tilting movement and wherein the hub is provided with nonyielding means coacting with the body of the wheel for limiting the lateral tilting movement or the movement of the wheel body longitudinally of the hub.

The invention consists in the details of construction and in the combination and arrangement of the several parts of my improved resilient wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein is disclosed a fragmentary view in transverse section illustrating a wheel constructed in accordance with an embodiment of my invention.

As disclosed in the accompanying drawings H denotes the hub of my improved wheel. Secured to the opposite ends of the hub H are the plates 1 and $1^a$, one of which being herein disclosed as a brake pulley although I do not wish to be understood as limiting myself in this respect. The plates 1 and $1^a$ may be secured to the hub H in any desired manner but it is preferred to employ the construction disclosed in the accompanying drawings and wherein the bolts 2 are disposed through the hub and through the plates 1 and $1^a$ and with which the nuts 3 engage in a conventional manner and for a well known purpose.

The plates 1 and $1^a$ are each of a diameter to extend beyond the periphery of the hub and whereby annular and non-yielding flanges $a$ are provided for a purpose which will be hereinafter more particularly referred to.

The periphery of the hub H midway of the flanges $a$ is provided with a plurality of annular recesses 4 substantially concentric to the bore of the hub H and seated within each of the grooves 4 is a shock absorbing agency 5 herein disclosed as a tube under inflation. The wheel body B comprises a central annular member or casing 6 formed of solid and non-yielding material and having its side marginal portions defined by the outstanding annular flanges 7 preferably integrally formed with the member or casing 6. Radiating from the member or casing 6 and locked thereto in any desired manner are the spokes S which are also suitably anchored at their outer end portions with the felly F. Engaged in a conventional manner with the felly F is a tire T which may be of any type preferred. The member or casing 6 is positioned between the flanges $a$ and is of a width less than the space between the flanges $a$ as is clearly illustrated in the accompanying drawings.

The mean diameter of the member or casing 6 is greater than the maximum diameter of the hub H between the flanges $a$ and the inner face of the member of casing 6 is provided with the annular recesses 8 concentric to the recesses 4 and of the same number. The shock absorbing agencies 5 are also seated within the recesses 8 as is clearly illustrated in the acompanying drawings.

The recesses 4 and 8 are of such depth as to hold the shock absorbing agencies or tubes 5 against rolling movement so that the flexibility of the agencies or tubes 5 is intermediate the hub H and the member or casing 6. By this arrangement the member or casing 6 and the part of the wheel body carried thereby are bodily movable longitudinally of the hub in either direction in the event the felly F or more particularly the tire T carried thereby should come into contact with an obstruction in its path. In practice should the felly or the tire T carried thereby come in contact with an obstruction, the wheel body will tilt laterally in a direction away from the force of contact so that the wheel will not ride over the obstruction, but will pass by a side thereof. This particular mounting of the wheel body B and as afforded by the shock absorbing agencies or tubes 5, will positively assure the tire T conforming to the surface of the road over which the wheel may be traveling.

The flanges $a$ are of such width to bridge the space between the periphery of the hub H and the opposed faces of the member or casing 6 irrespective of the load imposed upon the wheel. By this means solid and non-yielding surfaces are afforded with which the member or casing 6 or the flanges 7 thereof may contact to limit the bodily movement of the member or casing 6 longitudinally of the hub and also to limit the lateral tilting movement of the wheel body. This result is further facilitated in view of the fact that the member or casing 6 and the flanges 7 are also produced from a solid and non-yielding material as has been hereinbefore stated.

It is of especial importance to provide means to prevent the ingress of foreign substances, such as dust, to the shock absorbing agencies or tubes 5 and as herein disclosed this result is accomplished through the medium of the rings 9, snugly fitting within the opposite end portions of the member or casing 6 yet permitting the member or casing 6 to have sliding movement relative thereto and particularly when the wheel body is subjected to a bodily movement in a direction longitudinally of the hub. The rings are also of such a width as to have their inner walls spaced from the periphery of the hub H so that no undue obstruction will be offered to the relative radial movement of the hub H and the wheel body B.

The rings 9 are also of such size as to contact with the inner faces of the flanges $a$ and with the side walls afforded by the annular extension 10 formed centrally of the flanges $a$ and in the periphery in which the recesses 4, hereinbefore referred to, are produced, although this is not essential.

The present application is filed as a substitute and partly in continuation of my pending application for United States Letters Patent filed January 19, 1917, Serial No. 143351.

In the present application I have purposely omitted any disclosure relative to the driving connection between the hub H and the wheel body B as this forms no part of my present invention, although it is to be understood that suitable driving means may be employed so that the desired unitary movement of the hub H and the wheel will not be dependent upon the frictional contact of the shock absorbing agencies or tubes 5.

From the foregoing description, it is thought to be obvious that a resilient wheel constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A wheel of the character described comprising a wheel body including a central annular casing, a hub extending through the casing, the ends of the hub being provided with outstanding annular flanges overlying the side faces of the casing, said casing being of a width less than the space between the flanges of the hub, a shock absorbing agency positioned between the casing and the hub, and dust rings snugly fitting within the opposite end portions of the casing and contacting with the flanges at the ends of the hub, said casing and rings having relative sliding movement in a direction longitudinally of the hub.

In testimony whereof I affix my signature.

ORAM A. BOYER.